May 28, 1935.  J. M. MELOTT  2,002,672
VALVE FOR SLUSH PUMPS
Filed Dec. 28, 1927
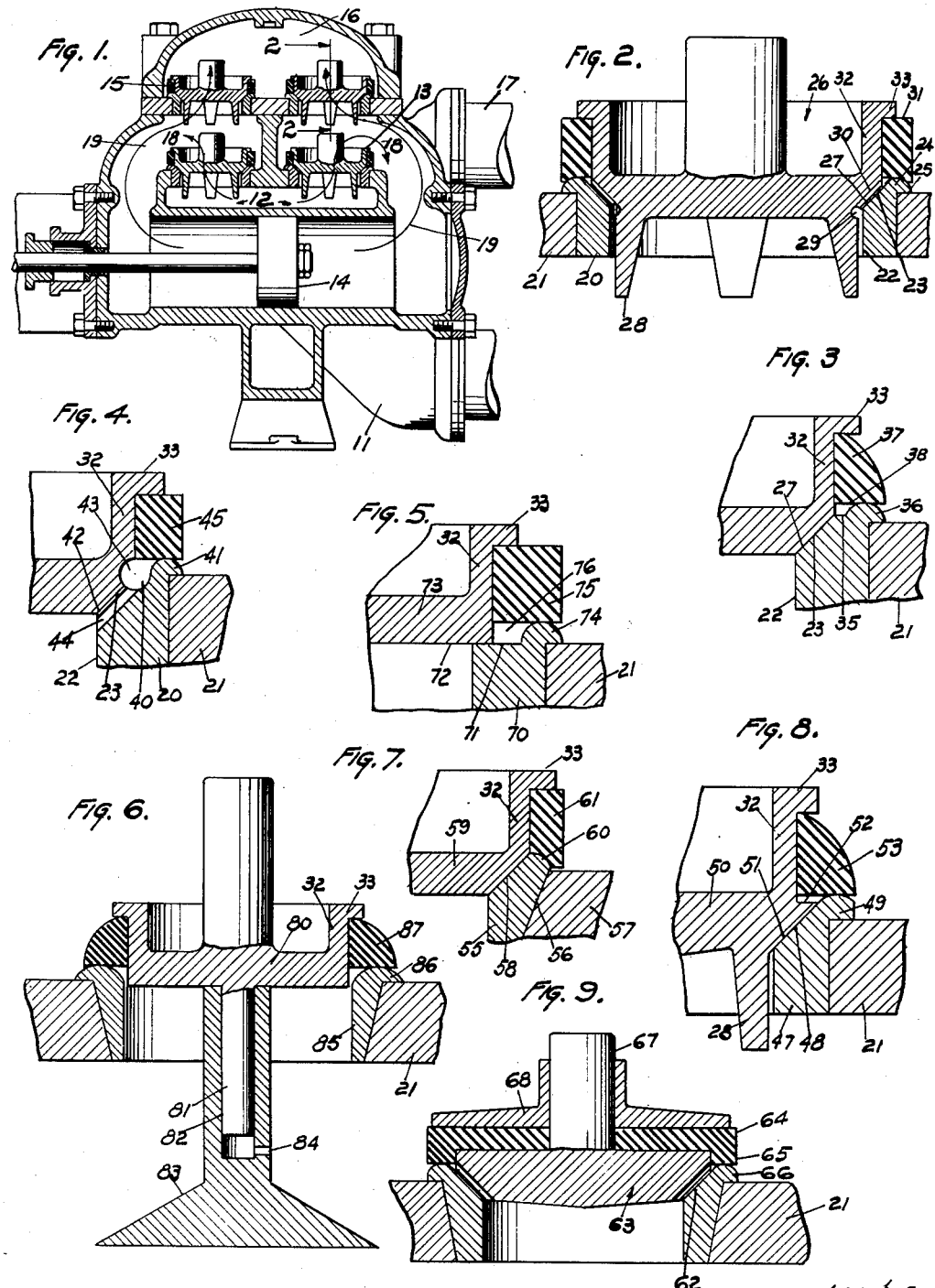

Patented May 28, 1935

2,002,672

UNITED STATES PATENT OFFICE 2,002,672

VALVE FOR SLUSH PUMPS

John M. Melott, Los Angeles, Calif., assignor to Charles E. Brown, Los Angeles, Calif.

Application December 28, 1927, Serial No. 243,057

14 Claims. (Cl. 251—127)

My invention is in valves for slush pumps, or the like.

An object of my invention in valves for slush pumps is a valve construction in which the valve, when in its closed position, bears against a seat having a metal to metal contact; such contact, however, is not designed to be absolutely leak-proof, but the closure is attained by means of a rubber packing, or the like, which engages a part of the valve seat.

A more particular object of my invention is in a slush pump in which the valve and the seat have a metal to metal contact and forming a closure seal between a resilient rubber ring, or the like, carried by the valve, and a rounded or curved annular part of the valve seat. This curved portion is utilized to give the seal-tight closure, as pebbles or the like do not interfere so much with the operation when caught between the rubber closure element and the curved metal part with which the rubber contacts.

A further object of my invention is to prevent the grit or the like from wearing the valve and the valve seat by the rubber and the sealing closure, and by constructing pressure relief passages or ducts through the valve or the valve seat to relieve the pressure of the fluid trapped between the rubber ring and the valve seat.

This present application may be considered as a modification of my patent application for "Valve for slush pump", Serial No. 220,185, filed September 17, 1927.

In constructing my invention I may employ a valve seat having a bearing surface forming a frustum of a cone with the apex downwardly, and the valve may have a complementary bearing surface engaging in a metal to metal contact with the coned part of the seat. The seat preferably has a curved annular section outside of the coned portion and against this ring, curved in cross-section, the resilient or rubber packing ring engages, such ring being carried by the valve and the ring bending or curving over such curved section of the seat.

In another construction I may have the seat with a flat or horizontal surface engaging and forming a stop for the motion of the valve. This also forms a metal to metal contact, but it is not intended to form a tight closure. The seat has an external ring like portion transversely curved, and a ring of resilient material, such as rubber, contacts with this portion, such ring being carried by the valve and forms the closure.

In the various constructions I have relief ducts or passages, either by small duct holes through the seat or through the valves or grooves at the working faces of these elements, so that there is a relief for the slush trapped between the valve and the seat, and back of the rubber or other resilient ring.

My invention will be more readily understood from the following description and drawing, in which:

Figure 1 is a longitudinal section through a typical slush pump.

Fig. 2 is a cross-section through a valve of the type having a seat in the form of a frustum of a cone, with a complementary shaped valve engaging therewith, and with the upper and outer part of the seat having a ring like portion curved in transverse section.

Fig. 3 is a detail section showing a modification of the shape of the valve seat and the resilient ring.

Fig. 4 is still another modification of the shape of the seat and the valve and the packing.

Fig. 5 is an alternative form of valve joint in which the seat and the valve have flat engaging surfaces, the valve carrying the resilient ring engaging the ring like curved portion of the seat.

Fig. 6 is a section showing another alternative form in which the travel of the valve is limited by an abutment engaging such valve and holding it in position for the ring to engage the curved part of the seat.

Fig. 7 is a detail modification of the conical bearing of the seat and valve, and the resilient ring.

Fig. 8 is a modification of the seat, valve and ring.

Fig. 9 is a further modification showing the frustum of a cone type of seat and valve with complementary co-acting surface and a flat ring of rubber or the like being held against the valve and forming the closure with the curved part of the seat.

In the drawing Fig. 1 is to illustrate a type of slush pump in which my valves may be utilized. In this type of pump the intake is indicated by the numeral 11 entering the pump at 12 and flowing upwardly through the valves 13. On the reciprocation of the piston 14 the fluid is forced out through the discharge valves 15 into the outlet chamber 16 and thence carried by the discharge pipe 17. The flow of the fluid on the intake stroke is indicated by the arrows 18 and on the out stroke by the arrows 19.

In this type of pump the valves are illustrated as being self-seating and requiring no spring.

However, in my construction the invention pertains principally to means for effecting the seal rather than the manner in which the valves are closed or the particular mounting for the valves.

In the construction shown in Fig. 2 a valve seat 20 in the form of a ring is mounted in the structural part 21 of the valve casing; this seat has preferably a cylindrical inner portion 22 and a bearing seat 23 which forms a frustum of a cone with the base upwardly. The seat is continued outside of this cone shaped part and has a ring like section 24 which is curved in cross section. There is an annular lip 25 bearing on the top of the structural part 21.

The valve, designated generally by the numeral 26, has a coned bearing surface 27 complementary to that of the seat and forming a metal to metal contact therewith. The lower portion of the valve has guide fingers 28 functioning to properly center the valve in the seat, and there is preferably an annular groove 29 adjacent the lower part of the bearing surface of the valve on the seat and discharging thereinto there are a series of grooves 30 formed either in the seat or in the bearing surface of the valve, or both, forming small release ducts for the slushing fluid.

The seal is made by a resilient ring 31 preferably of rubber which fits on a cylindrical part 32 of the valve, there being an annular shoulder 33 engaging the upper part of this ring. By this construction it will be noted that when the valve bears against the seat, there is a metal to metal contact, and the sealing closure is formed by the back pressure of the slushing fluid on the rubber ring pressing this into contact with the portion of the seat which is circular in cross-section, the ring being flexed to conform to this surface. The grooves or ducts allow the release of any slushing fluid caught between the resilient ring and the seat and valve.

In the construction illustrated in Fig. 3, at the base of the frustum of the coned part of the seat there is preferably an annular horizontal surface 35 within a ring-like curved section 36. In this instance I illustrate the resilient ring 37 as having a wide base 38 sufficient to fit over the curved section 36 and to partly spread thereover under the influence of the back pressure of the slushing fluid.

In the construction illustrated in Fig. 4, the seat has the bearing surface 23, and above this there is an annular curved section 40 with the outwardly curved portion 41. The valve has a bearing surface 42 complementary to that of the seat and also has an annular groove 43 registering with the groove 40 of the seat; thus making a relatively large annular opening, and from this opening there are a series of grooves 44 in the face of the seat or valve or both extending to the under side of the valve. In this illustration, the resilient ring 45 on the back pressure is forced slightly into the annular groove 43 around the curved section 41 and thereby forces any of the slushing fluid caught in the groove 43 through the grooves 44.

The construction of Fig. 8 functions somewhat the same as that shown in Fig. 3. The seat 47 is shown with the bearing surface 48 of a conical shape and the curved ring section 49 extending outwardly from the base of such coned section. The valve 50 has a complementary coned surface 51 and there is a flat annular surface 52 on the valve. The resilient ring 53 may be substantially the shape as that shown in Fig. 3 and in this construction the resilient ring is forced over the curved section 49 and then the slushing fluid trapped between this ring and the surface 52 is forced between the seat and the valve.

In the construction shown in Fig. 7, the seat 55 is shown with an outwardly coned surface 56 bearing against the fixed structure 57 of the pump. The seat has the coned bearing surface 58 which registers with the coned bearing surface of the valve 59. In this case it will be noted that the outwardly curved section 60 of the seat commences its curvature directly at the edge of the meeting surface of the seat and valve and does not overlap the structural part 57. In this instance the resilient ring 61 has its lower inner corner shaped to conform to the curved shape of the portion 60 of the seat.

The construction of Fig. 9 shows a valve seat 62 and valve 63 having conical bearing surfaces. In this case a flat ring 64 of resilient material with a downwardly projecting rim 65 is utilized to form the seal against the rounded edge 66 of the seat. This ring is centered by a stud 67 and is held in place by a bearing plate 68.

The construction of Fig. 5 shows an alternate type of valve in which case the seat 70 has a horizontal surface 71 which engages the under surface 72 of the valve 73 adjacent the periphery of such valve. The edge of the seat has a curved section 74 against which a seal is made by the resilient ring 75. In this type of valve the valve is guided in any suitable manner, and it will be noted that there is a space 76 left underneath the rubber ring, such ring being squeezed to a certain extent into this space, by the back pressure of the slushing fluid.

In the construction of the valve of Fig. 6, the valve element 80 is provided with a downwardly extending stem 81 which reciprocates in a socket 82 in a pedestal 83, this socket having a lateral outlet 84 at the bottom. The upper part of the pedestal forms a positive stop for the valve in its downward motion. In this case the valve seat 85 has a larger curved section 86 than in the other illustrations, and this curved section is engaged by the resilient ring 87.

The manner of operation and functioning of the valves above mentioned is believed apparent. Those which have the conical seat and valve bearing surface have these surfaces engage in contact, but the seal is made by the resilient ring engaging the peripheral curved section of the seat, and in order to prevent undue wear of the metal to metal contact of the valve of the seat, there are provided escape ducts or grooves for the slushing fluid. In the construction of Fig. 5 the valve is brought on the flat top surface of the seat, but this in itself is not relied on as a positive seal, the seal being by a rubber engaging the curved surface. In Fig. 6 there is no metal to metal contact of the seat and the valve, the seal, however, being through the medium of the curved portion of the seat and the rubber ring.

The advantage of the curved section bearing against the rubber is that any pebbles and grit caught on such surface are readily released on the succeeding stroke and do not cut the rubber to a great extent; and, moreover, when soft rubber is utilized, these particles of grit and pebbles become encased by the rubber when under compression and released when the compression is released.

It is to be understood that grooves may be formed either in the valve seat or in the plug in the construction of Figs. 2, 3, 4, 8, and 9, these being the constructions in which there is a space formed between the seat, the valve, and the resilient ring. As the fluid may be trapped in this space, the grooves are for the purpose of allowing expelling of such fluid when the valve is seated, and a pressure is exerted on the resilient ring.

A characteristic feature of my invention is that the resilient ring is mounted on a cylindrical surface of the valve plug and is restrained from upward movement by the annular shoulder 33 but when the valve is opened the ring is free to move in a direction away from this shoulder, that is, downwardly. However, when the valve is closed, the ring is compressed by contacting with the convex extension of the seat member, and in some forms, there is a hollow space below the inner portion of the bottom surface of the ring. (Note Figs. 2, 3, 4, 5 and 8.) When there is pressure on the valve the ring, being resilient, exerts a pressure on fluid trapped in this hollow space, and in the forms having a groove in the metal to metal conical bearing of the seat and the plug, such trapped fluid may drain.

Various changes may be made in the principles of my invention without departing from the spirit thereof, as set forth in the description, drawing and claims.

I claim:

1. In the art described, the combination of a valve housing having a valve seat therein, the seat having a conical shaped bearing surface with the apex down, a valve having a conical shaped bearing surface to form a metal to metal engagement with the seat, said valve having a cylindrical part extending upwardly above the conical part of the bearing surface and with an annular shoulder at the upper end of the cylindrical part, a resilient ring mounted on the cylindrical part and engaging the shoulder, said seat having a peripheral part at the top with a convex curve upwardly considered in a radial direction, said ring bearing on said curved part.

2. In the art described, the combination of a valve housing having a valve seat therein, said seat having a conical bearing surface with the apex down and having an upper peripheral part with a convex curve upwardly considered in a radial direction, a valve having a conical bearing surface to form a metal to metal contact with the seat and having guide fingers extending through the seat, said valve having a cylindrical part extending upwardly above the conical part of the seat and with an annular shoulder at the top, a resilient ring on the cylindrical part and bearing against the shoulder and contacting with the curved section of the seat in a closed position, there being grooves in the bearing surface of the seat and the valve to release trapped slushing fluid.

3. In the art described, the combination of a valve housing having a seat with a conical bearing surface with the apex down and with a horizontal annular surface and an outer peripheral portion at the top curved convexly considered in a radial direction, a valve having a complementary bearing surface to form a metal to metal contact with the seat and having a resilient ring to engage the curved section of the seat.

4. In a device as described, a valve seat having an inwardly sloping conical surface and an upper annular portion having a convex curve considered transversely, a valve having an inwardly tapered conical surface to form a metal to metal contact with the conical surface of the seat, the valve having an annular surface extending inwardly from its outer periphery and positioned below the top of the convex curve of the seat when in closed position, a cylindrical portion extending upwardly from the annular flat surface and having a resilient ring mounted thereon, the bottom of the ring being spaced above the annular surface of the valve and bearing on the convex surface of the seat.

5. In a device as described, a valve seat having a downwardly and inwardly conical bearing surface, a valve having an inwardly and downwardly conical surface to seat thereon, forming a metal to metal contact, the seat having a convexly curved annular rim considered transversely, extending above the conical surface, the valve having a cylindrical surface with a resilient ring mounted thereon, there being an annular horizontal surface or shoulder below the resilient ring, the said ring bearing on the convex rim of the valve seat.

6. In a valve, a valve seat and a valve plug having a circular metal to metal contact when closed, a marginal extension of the seat convexly curved considered in a radial direction outside of and above the said metal to metal contact, the plug having a cylindrical surface with an annular stop shoulder at the top, a resilient ring on the cylindrical surface and engaging the shoulder but free to move on the cylindrical surface in a direction away from the shoulder when the valve is open, the lower surface of the ring seating on said convex extension when the valve is closed, the peripheral portion of the ring being unconfined.

7. In a valve as claimed in claim 6, there being a space below the ring when the valve is closed defined in part by a horizontal annular surface between the cylindrical surface and the convex extension and part of the said cylindrical surface.

8. In a valve, a valve seat and a valve plug having a circular metal to metal contact when closed, a marginal extension of the seat convexly curved considered in a radial direction outside of and above the said metal to metal contact, the plug having a cylindrical surface with an annular stop shoulder at the top, a resilient ring on the cylindrical surface engaging the shoulder and the convex extension when the valve is closed, the peripheral portion of the ring being unconfined, there being an open space between the lower surface of the ring, the convex extension and part of the plug when the valve is closed.

9. In a valve, a valve seat and valve plug having a circular downwardly and inwardly tapered conical metal to metal contact when closed, a marginal extension of the seat convexly curved considered in a radial direction outside of and above the said metal to metal contact, the plug having a cylindrical surface with an annular stop shoulder at the top, a resilient ring on the cylindrical surface engaging the shoulder but free to move on the cylindrical surface in a direction away from the shoulder, the lower surface of the ring seating on said convex extension when the valve is closed, the peripheral portion of the ring being unconfined.

10. In a valve as claimed in claim 9, there being a space below the bottom of the ring defined by that portion of the lower surface of the ring between the said cylindrical surface and its line of contact with the convex curved extension and part of the valve seat.

11. In a valve as claimed in claim 9, there being a space below the bottom of the ring defined by that portion of the lower surface of the ring between the said cylindrical surface and its line of contact with the convex curved extension and part of the valve seat and a groove in the metal to metal contact from said space.

12. In a valve, a valve seat and a valve plug having a circular downwardly and inwardly tapered conical metal to metal contact when the valve is closed, a marginal extension of the seat convexly curved considered in a radial direction outside of and above the said metal to metal contact, the plug having a cylindrical surface with an annular stop shoulder at the top, there being an annular horizontal metal surface between the said cylindrical surface and the convex extension when the valve is closed, a resilient ring on the cylindrical surface and engaging the said shoulder free to move on the cylindrical surface in a direction away from the shoulder when the valve is open and when the valve is closed, the lower surface of the ring engaging said convex extension, there being a hollow space defined in part by said ring, said annular metal surface, part of the said cylindrical surface and part of said convex extension, said ring being peripherally unconfined.

13. In a valve as claimed in claim 12, the said annular horizontal metal surface being on the valve seat member between the upper line of the said metal to metal contact of the seat and plug and the said convex extension.

14. In a valve as claimed in claim 12, the said annular horizontal metal surface being on the valve plug member between the said cylindrical surface and the upper line of the said metal to metal contact of the seat and plug when the valve is closed.

JOHN M. MELOTT.